United States Patent [19]
Strassberg

[11] Patent Number: 5,575,880
[45] Date of Patent: Nov. 19, 1996

[54] METHOD FOR STAMPING HEAT-SENSITIVE SHEETS

[76] Inventor: Gerson Strassberg, 18 Engineers Rd., Roslyn Harbor, N.Y. 11576

[21] Appl. No.: 336,375

[22] Filed: Nov. 8, 1994

[51] Int. Cl.$^6$ .......................... B32B 31/18; B32B 31/20; B32B 31/28
[52] U.S. Cl. ...................... 156/251; 156/275.1; 156/289; 156/308.4; 156/380.7; 156/537; 493/203; 493/209; 493/267
[58] Field of Search .................................... 156/251, 267, 156/268, 269, 275.1, 289, 290, 308.4, 324, 380.7, 380.8, 515, 537, 581; 493/203, 209, 267

[56] References Cited

U.S. PATENT DOCUMENTS

| | | | |
|---|---|---|---|
| Re. 26,075 | 9/1966 | Canno | 156/308.4 |
| 743,317 | 6/1903 | Naugle . | |
| 932,742 | 8/1909 | Young . | |
| 2,074,949 | 11/1933 | Swift . | |
| 2,584,632 | 2/1952 | Southwick | 156/289 |
| 2,631,646 | 3/1953 | Gannon | 156/380.7 |
| 2,748,048 | 5/1956 | Russell | 156/289 |
| 2,786,792 | 3/1957 | Mikiska | 156/289 |
| 3,294,615 | 12/1966 | Long | 156/537 |
| 3,441,959 | 4/1969 | Sears | 156/289 |
| 3,954,049 | 5/1976 | Brieske | 493/203 |
| 4,002,519 | 1/1977 | Moseley | 156/308.4 |
| 4,978,055 | 12/1990 | Miller | 156/275.1 |

Primary Examiner—Daniel Stemmer
Attorney, Agent, or Firm—Collard & Roe, P.C.

[57] ABSTRACT

A method for forming an item by partially fusing selected portions of two sheets together. A non-heat-sensitive barrier sheet is inserted between two heat-sensitive sheets. The sheets are stamped with a die to fuse portions of the heat-sensitive sheets together remote from the barrier sheet. The barrier sheet and waste heat-sensitive sheet material is removed to leave the item. The method has particular application to stamping envelopes from a clear flexible vinyl material in a single continuous stamping operation.

3 Claims, 5 Drawing Sheets

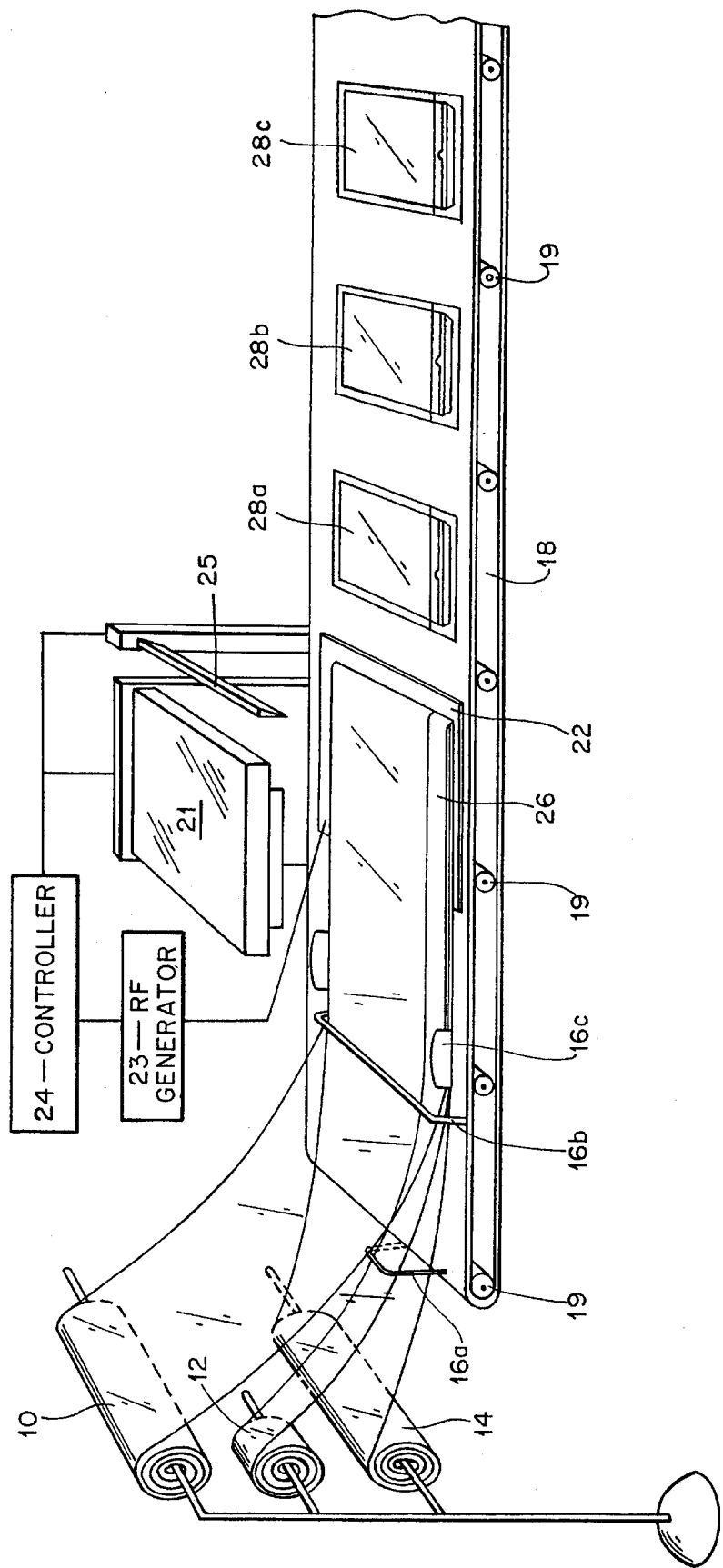

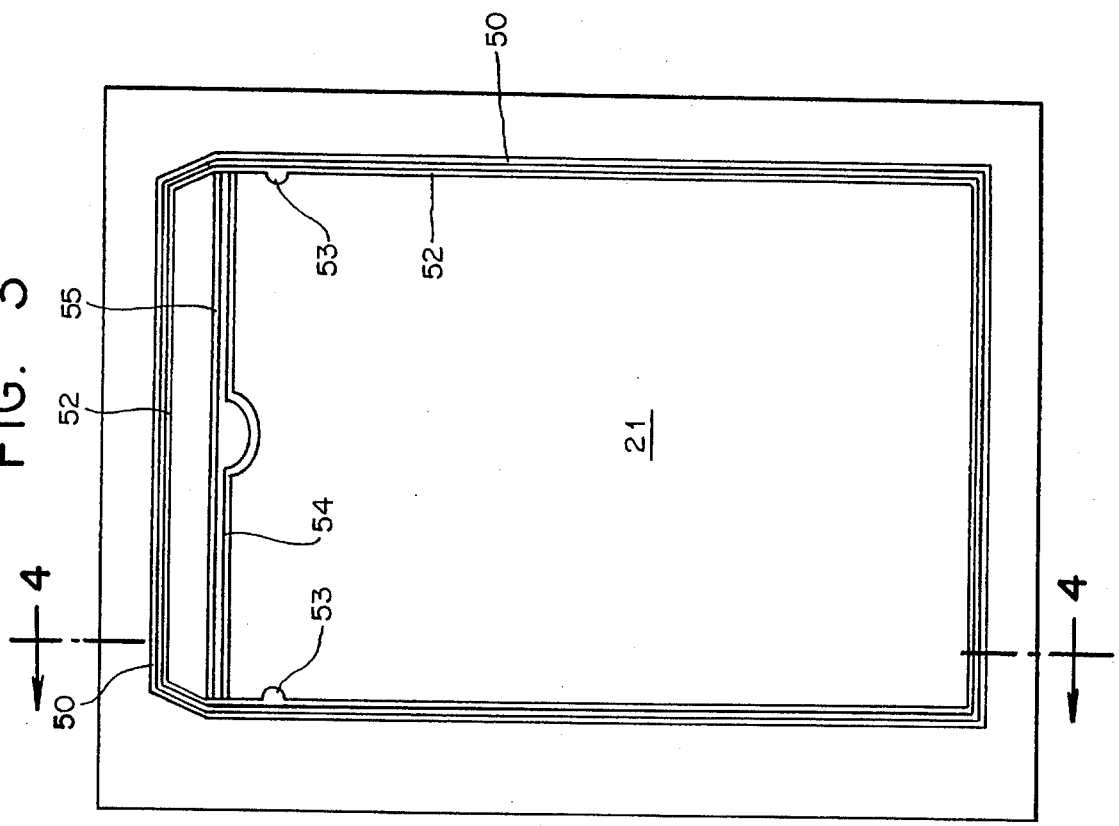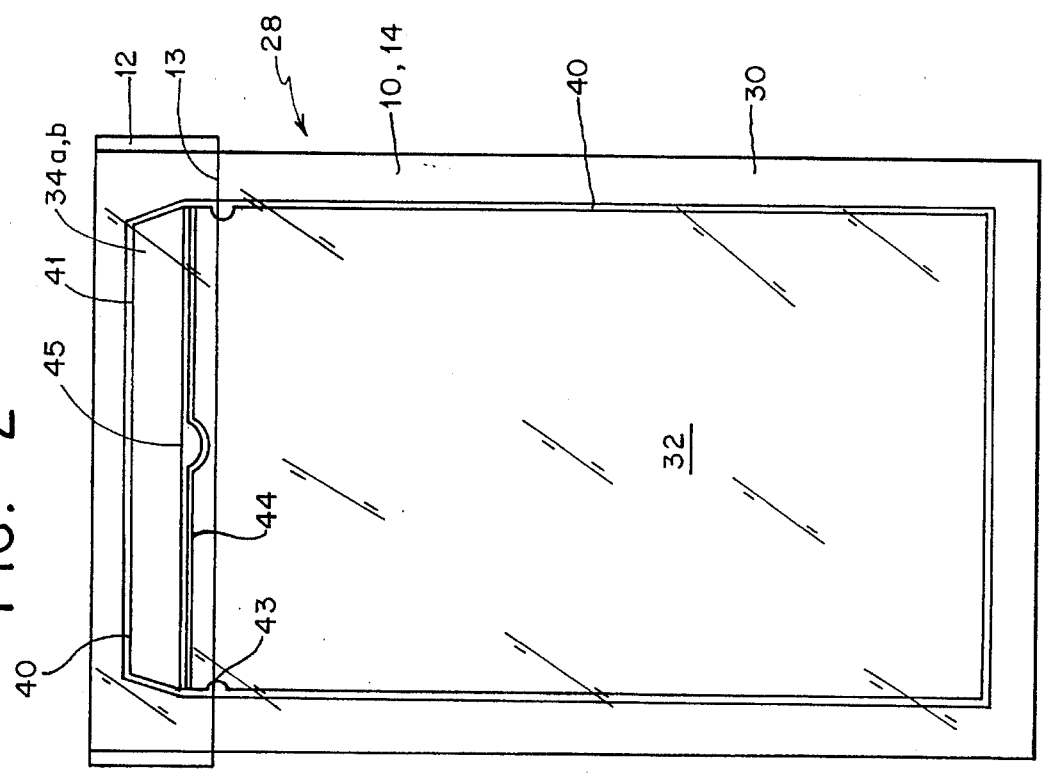

ated. The sheets are formed by cutting the length of material from a continuous roll of material.
METHOD FOR STAMPING HEAT-SENSITIVE SHEETS

BACKGROUND OF THE INVENTION

1. Field of the Invention

The present invention relates to a method for stamping heat-sensitive sheets. More particularly, it relates to a method for selectively joining heat-sensitive sheets together to form envelopes and the like.

2. The Prior Art

According to the prior art, pairs of clear flexible sheets are bound together along one or more edges to form various pocket or envelope constructions. A large variety of items including documents and records are placed within the envelopes for safe keeping while remaining visible. However complex construction are generally not possible because of limitations inherent with the materials and method used according to the prior art.

Accordingly, it would be desirable to provide a method for continuously stamping sheet material in which several different operations are carried out on the sheet material during a single stamping cycle.

SUMMARY OF THE INVENTION

It is therefore the objection of the present invention to overcome the drawbacks of the prior art and to provide a streamlined method for stamping heat-sensitive sheets.

It is a further object of the present invention to provide such a method where the opposed sheet can be selectively joined together, molded, and cut all with in a single stamping cycle.

These and other related objects are achieved according to the invention by a method for forming an item by partially fusing selected portions of two sheets together. Initially, a barrier sheet is inserted into selected regions between two heat-sensitive sheets. The sheets are then stamped with a die to fuse portions of the heat-sensitive-sheets together outside of the selected regions. The barrier sheet and waste heat-sensitive sheet material are removed to leave the item. The stamping step consists of placing the sheets between the die and a flat electrically conductive surface.

The die has a first relief element and a second relief element with the height of the second relief element being greater than that of the first relief element. The heat-sensitive sheets are cut where they are stamped by the second relief element, both inside and outside of the selected regions. The heat-sensitive sheets are fused together where they are stamped by the first relief element outside of the selected regions. The heat-sensitive sheets remain separate from each other and are molded where they are stamped by the first relief element inside the selected region. The stamping process includes pressing the die against the sheets under pressure and applying radio frequency alternating current to the die in the electrically conductive surface to RF weld the heat-sensitive sheets together. The barrier sheet is polyester and the heat-sensitive sheets are PVC.

In a particular embodiment, the method is used to form an envelope with a closure flap adjacent a top edge thereof. A barrier sheet, for example Mylar, is inserted between two equally-sized pieces of heat-sensitive sheets, for example PVC. with each sheet having a top edge and a width. The Mylar sheet width is less than the width of the PVC sheets. The top edges of all of the sheets are aligned with each other. The aligned sheets are stamped with a die to fuse portions of the PVC sheets together to form the envelope. The Mylar sheet prevents a section adjacent the top edges from fusing together thereby forming a pair of flaps. One of the flaps, the Mylar sheet and the waste PVC sheet material are removed to leave an envelope with a single closure flap. The stamping step includes placing the aligned sheets between the die and the flat electrically conductive surface, pressing the die against the aligned sheets under pressure, and applying radio frequency alternating current to the die and the electrically conductive surface to RF weld the PVC sheets together. The sheets are formed by cutting the length of material from a continuous roll of material.

Alternatively, a method is provided for simultaneously forming a pair of envelopes, each having a closure flap adjacent a top edge thereof. A Mylar sheet is inserted between two equally sized PVC sheets, with each sheet having a length and a width. The Mylar sheet width is less than the width of the PVC sheets. The Mylar sheet is aligned centrally along the width of the PVC sheets. The aligned sheets are stamped with a die to form a pair of envelopes across the width of the PVC sheets with their top edges facing each other. The die fuses portions of the PVC sheets together with the Mylar sheet preventing a section adjacent each top edge from fusing together, whereby two flaps are formed on each envelope. The Mylar sheet, the waste PVC sheet material and one flap from each envelope are removed to leave a pair of envelopes, each with a single closure flap. Several pairs of envelopes may be formed along the length of the sheets. The sheets are cut from a continuous roll of material. The stamping step includes RF welding.

BRIEF DESCRIPTION OF THE DRAWINGS

Other objects and features of the present invention will become apparent from the following detailed description considered in connection with the accompanying drawings which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 1 is a perspective view of the various sheet layers being aligned under the die for stamping and cutting;

FIG. 2 is a top plan view of a stamped set of sheets;

FIG. 3 is a top plan view of the die;

DETAILED DESCRIPTION OF PREFERRED EMBODIMENTS

Figure 4:
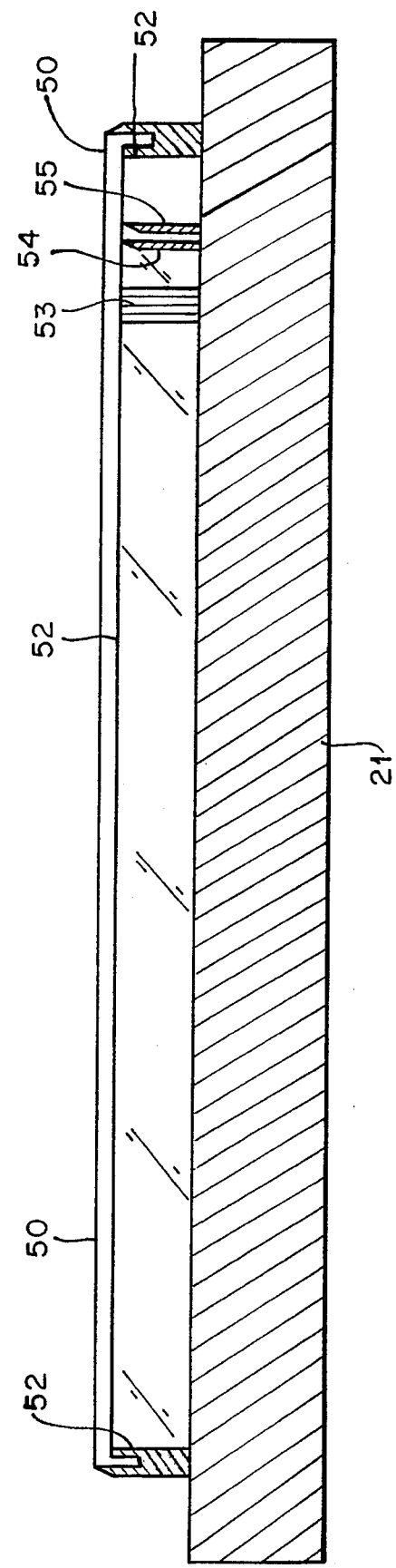
FIG. 4 is a cross-sectional view taken along the line 4-4 from FIG. 3.

Referring now in detail to the drawings and, in particular, to FIG. 1, there is shown equipment used for continuously stamping heat-sensitive sheets to form various items. On the left input side of the equipment, three rolls of flexible sheet material 10, 12 and 14 are mounted for unrolling the sheet material and feeding it into the equipment for processing. First roll 10 and third roll 14 are heat-sensitive materials, for example, a heavy-gauge waterproof material. If the manufactured item will be used to store documents, the material will ideally resist copy transfer from photocopies and laser printed documents. An example of acceptable materials are clear flexible vinyl or clear flexible polyvinyl chloride (PVC). The second roll 12 is a flexible non-heat-sensitive material designated as a barrier material, for example, polyester, which is sold under the trade name Mylar.

Generally, first roll 10 and third roll 14 have the same width and second roll 12 has a substantially narrower width for making envelopes. The area where the heat-sensitive materials 10 and 14 contact each other may be fused together. For example, materials 10 and 14 may be fused together about their periphery to form a pocket or envelope. However, the materials 10 and 14 cannot be fused together where the barrier material 12 separates them. Materials 10, 12 and 14 are stamped and cult into smaller sized sheets during processing. It should be understood that a variety of different materials may be used and that the material may be precut before processing. The important characteristics are that materials 10 and 14 can be joined, fused, or welded together by the application of heat, pressure, and/or radio frequency, etc. and that the central barrier layer prevents the outer layers from being joined together.

A set of guides 16a, 16b, and 16c aligns the closest edges of the material with each other as the material moves along a conveyor belt 18 driven by rollers 19. The aligned materials are fed into the stamping station underneath the die 21 and directly above an electrically conductive flat surface 22. Surface 22 is made from an aluminum plate, for example. Once the pre-stamped sheets 26 are advanced to a position completely below die 21, conveyor belt 18 stops momentarily and controller 24 lowers die 21. Die or platen 21 is mounted on a C-press or mounted on an air or hydraulic cylinder, for example. Die 21 exerts pressure against flat surface 22 sandwiching the pre-stamped sheets 26 therebetween. Controller 24 then activates RF generator 23 and a radio frequency (RF) alternating current is impressed upon die 21 and electrically conductive surface 22 to stamp and weld the sheets. The RF alternating current is applied for several seconds following which the die remains pressed against the sheets for several more seconds, before returning to its uppermost position. In this manner, the sheets are RF welded and then given several seconds to set under pressure. A knife 25 cuts the material to form sets of stamped sheets 28a, 28b and 28c.

FIG. 2 shows an enlarged top plan view of one of the stamped sheets 28. The various sheets 10, 12 and 14 can be seen with their upper edges aligned. Barrier sheet 12 extends across the top portion with its lower edge defining a barrier line 13. Sheets 10 and 14 can be RF welded to each other below barrier line 13. Above barrier line 13, where sheet 12 separates sheets 10 and 14, sheets 10 and 14 can be stamped but not welded together. The item shown here is an envelope 32 with waste material 30 extending around the periphery of envelope 32. The body of envelope 32 is formed by a welded seam 42 along which sheets 10 and 14 are welded to each other. Weld line 42 begins at barrier line 13, extends down around the body of envelope 32 in a U-shape and terminate on the opposite side at barrier line 13. Since the materials above barrier line 13 cannot be welded together, an opening is formed for access to the inside of envelope 32. Additional vertical weld lines could be provided on the envelope to provide separated pockets within the envelope, for example.

FIGS. 3 and 4 show die 21 which is used to stamp the sheets together. Die 21 includes an upper relief element 50 and a lower relief element 52, both of which extend around the periphery of the die in an approximately rectangular configuration. As can be seen in FIG. 4, upper relief element 50 has a greater height than lower relief element 52. At the same height, as lower relief element 52, there are semicircular relief elements 53, a thumb cut relief element 54, and a further relief element 55.

The various relief elements from FIGS. 3 and 4 correspond to different features on FIG. 2 as follows. The outermost relief element, upper relief element 50, which is at the highest elevation, forms a tear seal or cut line 40 around the periphery of the envelope. Upper relief element 50 stamps the sheets so thinly that waste material 30 can be easily removed from envelope 32 (see FIG. 5). Semicircular relief elements 53 form semicircular reinforcements 43 where sheets 10 and 14 are welded together just below barrier line 13. Lower relief element 52 forms a U-shaped welded line 42 below semicircular reinforcements 43. Welded line 42 resides just inside of cut line 40. Part of lower relief element 52 extends above semicircular relief elements 53 and forms a stamp line 41 along the top portion of envelope 32. The stamped line 41 has the same appearance as welded line 42, however, sheets 10 and 14 are not welded together along stamped line 41. The sheets are only welded together below barrier line 13.

Figure 5:
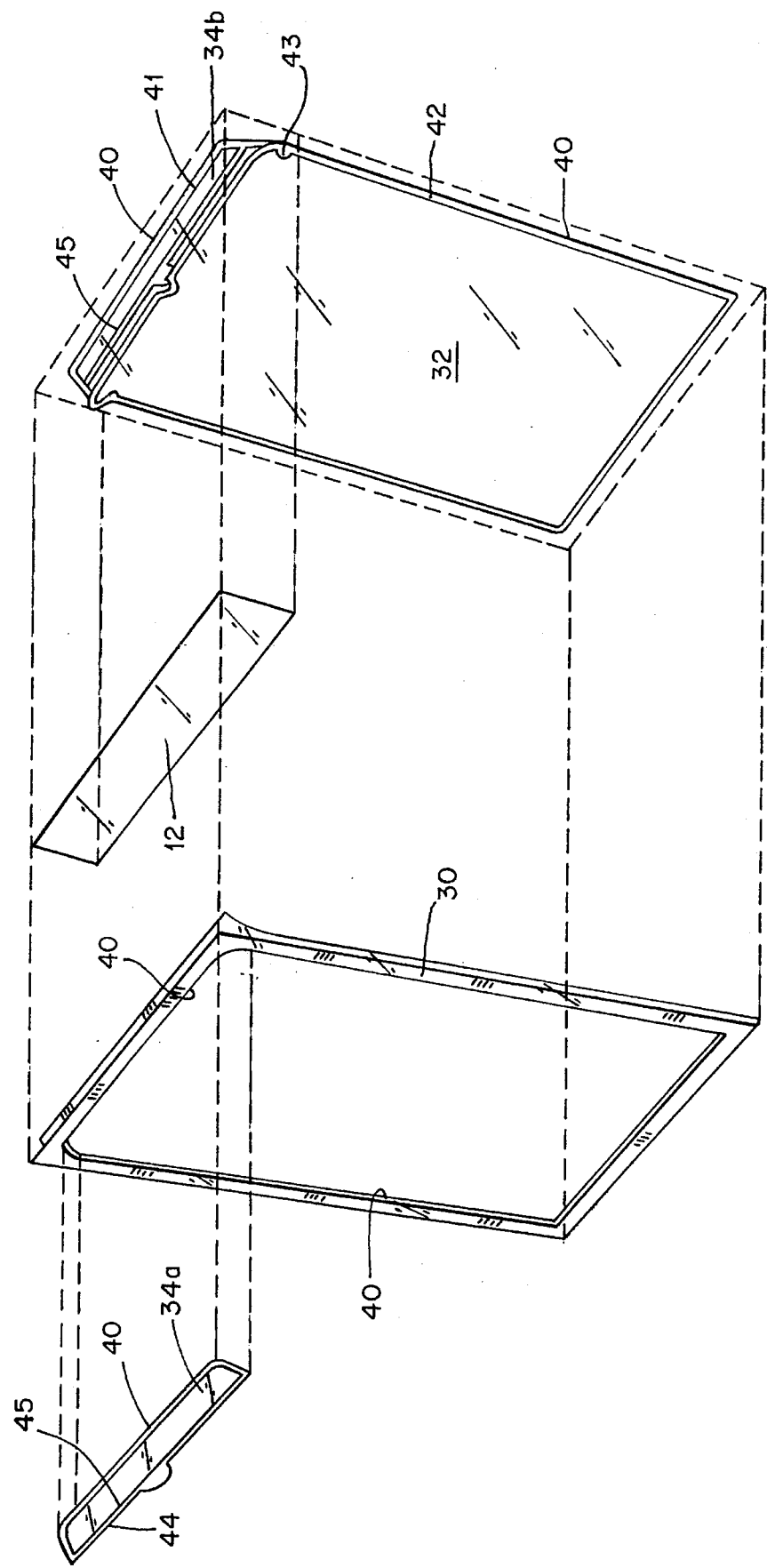
FIG. 5 is an exploded view of the stamped sheet.

The semicircular reinforcements 43 provide a relatively large surface area at the opening of the envelope where the sheets are initially welded together in order to prevent the sheets from tearing apart below barrier line 13. Across the upper edges of die 21 are thumb cut relief element 54 and a further relief element 55. These relief elements form a thumb cut/tear line 44 and a fold line 45, respectively, in both top flaps 34a and 34b of sheets 10 and 14. As can be seen in FIG. 5, one of the flaps 34a is removed from envelope 32 along tear line 44. The remaining flap 34b is folded along fold line 45 to be tucked into the envelope opening.

FIG. 5 also shows waste material 30 which has been removed along tear seal or cut line 40 just outside of weld line 42. Sheet 12 has been removed from between flaps 34a and 34b and flap 34a has also been torn off along tear line 44. Envelope 32 remains with the attached flap 34b and the easy entry opening which extends down along opposite edges of the body of the envelope to semicircular reinforcements 43.

Surprisingly, it was discovered that by selective placement of the barrier sheet and selective height and configuration selection of the relief elements that a variety of effects could be obtained during a single stamping process. For example, upper relief element 50 creates a cut line through both sheets 10 and 14 which is unaffected by the placement of sheet 12 or barrier line 13. Lower relief element 52 uniformly stamps sheets 10 and 14 and RF welds the sheets together along that stamped line below the barrier line. The relief element 55 stamps a fold line in an area above the barrier line. The thumb cut relief element 54 provides a tear line above barrier line 13. Thus, a varied combination of welded lines, stamped unwelded lines, tear lines and folded lines can all be achieved in a single stamping operation by selectively positioning a barrier sheet between two heat-sensitive sheets.

Figure 6:
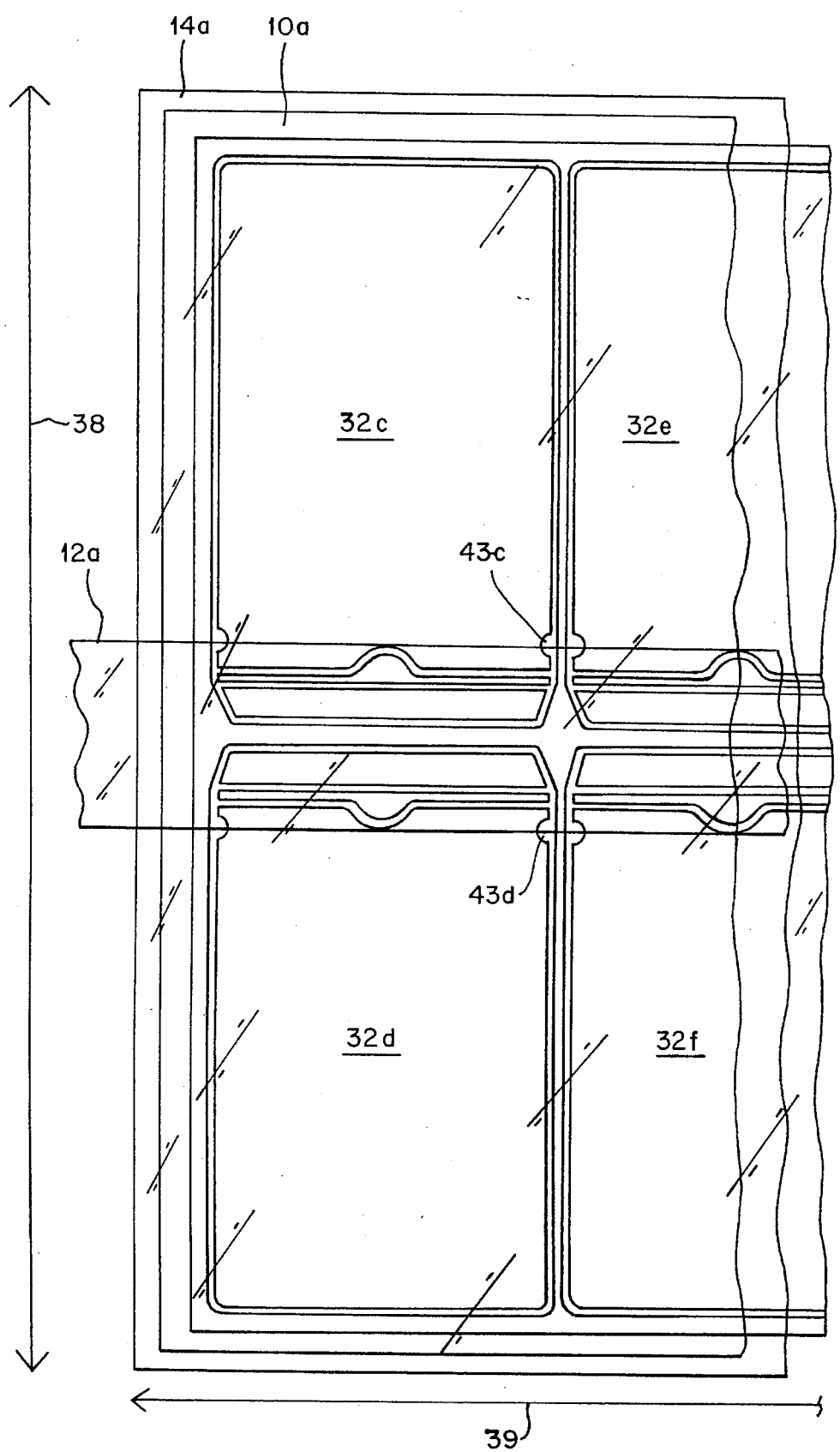
FIG. 6 is a fragmentary top plan view of an alternate configuration for the stamped sheets.

FIG. 6 shows a further example of these various effects where two envelopes 32c and 32d are formed across a width 38 of sheets 10a and 14a. In this instance, barrier sheet 12a is centrally disposed along width 38. The flaps of envelopes 32c and 32d face each other in overlying relationship with barrier sheet 12a. Multiple pair of envelopes 32e and 32f may be formed along a length 39 of the sheets 10a, 12a and 14a. Barrier sheet 12a extends down to semicircular reinforcements 43c and 43d in each respective envelope. The body and flap of each envelope are formed in a manner similar to that described earlier. As can be appreciated, multiple pairs of envelopes can be easily formed in this manner by a continuous single stamping operation. The size of the envelopes can be adjusted to fit numerous envelopes across the width of the sheets. For example a range of sizes can be produced to store licenses, passports, credit cards, photographs, social security cards, identification cards, insurance policies, commuter tickets, hospital records, industrial records, etc. A wide variety of items can be formed by selectively locating a barrier sheet between two heat-sensitive sheets and by adjusting the type of stamping.

While several embodiments of the present invention have been shown and described, it is to be understood that many changes and modifications may be made thereunto without departing from the spirit and scope of the invention as defined in the appended claims.

What is claimed is:

1. A method for forming an envelope with a closure flap adjacent a top edge thereof, comprising the steps of:

inserting a barrier sheet between two equally-sized heat-sensitive sheets, each of said sheets having a top edge and a width, said barrier sheet width being less than the width of said heat-sensitive sheets;

aligning said top edges with each other;

stamping said aligned sheets with a die to fuse portions of said heat-sensitive sheets together to form said envelope, said barrier sheet preventing a section adjacent said top edges from fusing together thereby forming a pair of flaps; and removing one of said flaps, said barrier sheet and waste heat-sensitive sheet material to leave an envelope with a single closure flap.

2. The method according to claim 1, wherein said step of stamping comprises:

placing said aligned sheets between the die and a flat electrically-conductive surface;

pressing said die against said aligned sheets under pressure; and applying radio frequency alternating current to said die and said electrically-conductive surface.

3. The method according to claim 2, wherein said barrier sheet is cut from a continuous roll of polyester and said heat-sensitive sheets are cut from a continuous roll of polyvinyl chloride.

* * * * *